(12) United States Patent
Budin

(10) Patent No.: US 9,245,300 B2
(45) Date of Patent: Jan. 26, 2016

(54) SOCIAL NETWORK MAPPING

(75) Inventor: Eric Budin, Rosemont, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 235 days.

(21) Appl. No.: 13/613,066

(22) Filed: Sep. 13, 2012

(65) Prior Publication Data

US 2014/0074925 A1    Mar. 13, 2014

(51) Int. Cl.
| | |
|---|---|
| G06Q 50/00 | (2012.01) |
| G06Q 10/10 | (2012.01) |
| H04L 7/00 | (2006.01) |
| G06F 13/00 | (2006.01) |
| G06F 15/16 | (2006.01) |

(52) U.S. Cl.
CPC ............... *G06Q 50/01* (2013.01); *G06Q 10/10* (2013.01); *G06Q 10/107* (2013.01); *H04L 7/00* (2013.01); *G06F 13/00* (2013.01); *G06F 15/16* (2013.01)

(58) Field of Classification Search
CPC ........... G06F 3/00; G06F 3/048; G06F 15/16; G06F 17/30; G06F 13/00; G06F 15/00; G06F 15/173; G06F 17/00; G06F 17/30002; G06F 17/30908; G06F 17/40; H04M 3/42; H04L 7/00; H04L 51/00; H04L 51/12; H04L 51/16; G06Q 10/00; G06Q 10/06; G06Q 10/063114; G06Q 10/10; G06Q 10/107
USPC .................................. 709/201–204, 226, 248
See application file for complete search history.

(56) References Cited

U.S. PATENT DOCUMENTS

| | | | |
|---|---|---|---|
| 7,613,776 B1 * | 11/2009 | Ben-Yoseph ................. | 709/206 |
| 7,869,792 B1 * | 1/2011 | Zhou et al. ................... | 455/411 |
| 8,059,809 B1 * | 11/2011 | Zhang et al. ............ | 379/211.04 |
| 8,630,398 B2 * | 1/2014 | Gundotra et al. ........ | 379/114.03 |
| 8,726,165 B1 * | 5/2014 | Phillips et al. ................ | 715/739 |
| 2005/0198131 A1 * | 9/2005 | Appelman et al. ........... | 709/204 |
| 2006/0036692 A1 * | 2/2006 | Morinigo et al. ............. | 709/206 |
| 2008/0133580 A1 * | 6/2008 | Wanless et al. ............... | 707/102 |
| 2008/0222238 A1 * | 9/2008 | Ivanov et al. ................. | 709/202 |
| 2008/0263457 A1 * | 10/2008 | Kim et al. ..................... | 715/753 |
| 2008/0270038 A1 * | 10/2008 | Partovi et al. ................. | 702/19 |
| 2009/0138460 A1 * | 5/2009 | Gorti et al. ........................ | 707/5 |
| 2010/0057732 A1 * | 3/2010 | O'Sullivan et al. ............... | 707/6 |
| 2010/0063877 A1 * | 3/2010 | Soroca et al. .............. | 705/14.45 |
| 2010/0138390 A1 * | 6/2010 | Lobo et al. ..................... | 707/640 |
| 2010/0205242 A1 * | 8/2010 | Marchioro et al. ........... | 709/203 |
| 2010/0257239 A1 * | 10/2010 | Roberts ......................... | 709/204 |
| 2010/0306185 A1 * | 12/2010 | Smith et al. ................... | 707/709 |
| 2011/0130168 A1 * | 6/2011 | Vendrow et al. ............ | 455/556.1 |
| 2011/0225291 A1 * | 9/2011 | Dobroth et al. ............... | 709/224 |
| 2011/0319058 A1 * | 12/2011 | Ankolekar et al. ........ | 455/414.1 |
| 2012/0129572 A1 * | 5/2012 | Johnstone et al. .......... | 455/552.1 |
| 2012/0198015 A1 * | 8/2012 | Gorti et al. .................... | 709/206 |
| 2013/0006974 A1 * | 1/2013 | Agrawal et al. ............... | 707/723 |
| 2013/0132395 A1 * | 5/2013 | Gupta ............................ | 707/740 |
| 2014/0081914 A1 * | 3/2014 | Smith et al. ................... | 707/614 |

\* cited by examiner

*Primary Examiner* — Brian J Gillis
*Assistant Examiner* — Boris Grijalva Lobos
(74) *Attorney, Agent, or Firm* — Banner & Witcoff, Ltd.

(57) ABSTRACT

Methods and systems are disclosed that may retrieve and filter a call history log or related data, select users based on the results of filtering, and provide proposed contacts to a communication service. The filtering may comprise a variety of criteria and the criteria may be assigned different weights.

19 Claims, 9 Drawing Sheets

1000

```
Home – Web Browser                                          – | □ | X
◄ ►   http://www.domainname.com/webportal/JohnDoe       ▼

File  Edit  View  Favorites  Tools  Help
                                                        Hi John Doe!
  Web Portal      Home | My Account | Services | News | Contact Us    log out Home            ☐  Welcome to Your Web Portal
  My Account         Select criteria and respective weights below to
  -- Customize Algorithm  customize your own algorithm for your TV Video
  -- Social Networks      Conferencing Social Network.
     -- Facebook
     -- Twitter       Criteria:
     -- Skype
     -- Other      ☒   Area Code:    [Select Weight  ▼]
  Services
  News             ☐   Call Duration: [Select Weight  ▼]
  Contact Us
                  ☒   Call Time:     [Select Weight  ▼]
  [       ]
   Search                          Submit Done
```

FIG. 10

SOCIAL NETWORK MAPPING

FIELD OF ART

Some features described herein relate generally to mapping information from one service to another. Some aspects relate to determining contacts for a social network or another communication service.

BACKGROUND

People are using computing devices to communicate with each other more and more, often using platforms and services, typically referred to as social networking services, such as PLAXO, SKYPE, FACEBOOK, MYSPACE, TWITTER, LINKEDIN, etc. Such services may be computer network based services that allow members to communicate with one another. Social networking services are often opt-in services. Typically, each member creates an account by setting a username or other identifier for identifying the member within the network and a password for preventing others from representing their usernames. Once an account is created, members can log-in (or sign-in) and log-out (or sign-out) of the social networking service as they wish.

The same person may belong to multiple social networks. Generally, a different account must be created for each social networking service. Different social networking services may offer users different experiences and may allow users to perform various functions. Thus, it is not uncommon for a person to belong to more than one social networking service. But, whether a person belongs to one or more social networking services, managing contacts on the social networking services may be difficult. The number of members of a social network can reach into the millions. Finding specific members that a particular user wishes to contact can therefore be challenging. Aspects of this disclosure help in overcoming or reducing the difficulty of this and other challenges.

SUMMARY

Some or all of the various features described herein may assist in improving user interactions with and management of social network communication services. In particular, some or all of the systems described below provide the ability to populate contacts in a social network communication service.

In accordance with one illustrative embodiment, one aspect of the disclosure relates to retrieving, from a first communication service, data representing a first user's communications (e.g., call history data or a call history log) made using the first communication service. The data (e.g., a call history log) may be filtered using one or more criteria, and users (e.g., call participants) in the filtered data may be selected. Further, information identifying the selected users as proposed contacts for the first user in a second communication service (e.g., a social network communication service), different from the first communication service, may be provided. The disclosure also teaches that different criteria may be used for proposing contacts on different social communication services. In some aspects, criteria for proposing contacts for the same member of multiple social network communication services may be different for each of the multiple social network communication services. Moreover, in some aspects, the criteria may be customized by the user. Also, the disclosure relates to a method for performing the above steps, as well as a computer-readable medium and computing device for implementing such a method.

Other details and features will also be described in the sections that follow. This summary is not intended to identify critical or essential features of the inventions claimed herein, but instead merely summarizes certain features and variations thereof.

BRIEF DESCRIPTION OF THE DRAWINGS

Some features herein are illustrated by way of example, and not by way of limitation, in the figures of the accompanying drawings and in which like reference numerals refer to similar elements.

FIG. 10 is a high-level diagram illustrating an example embodiment of still another aspect of the present disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
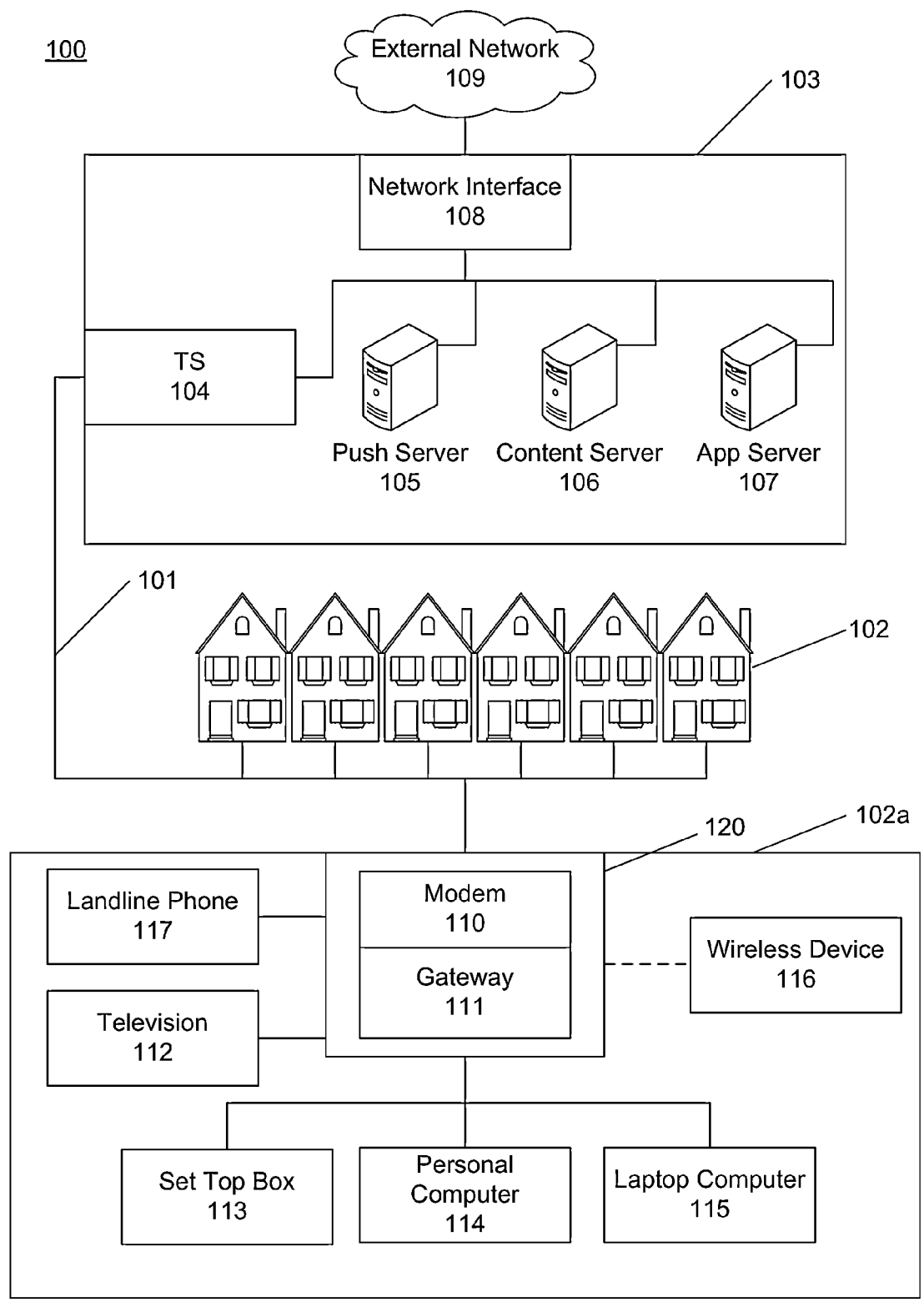
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CABLELABS), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WIMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MYSQL, OSX, BSD, UBUNTU, REDHAT, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data collected, such as a call history log, as a result of performing steps described herein.

An example premises 102a, such as a home, may include an interface 120. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as televisions 112, additional STBs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117, and any other desired devices. Examples of the local network interfaces include Multimedia Over Coax Alliance (MOCA) interfaces, Ethernet interfaces, universal serial bus (USB) interfaces, wireless interfaces (e.g., IEEE 802.11, IEEE 802.16), analog twisted pair interfaces, Bluetooth interfaces, and others.

Figure 2:
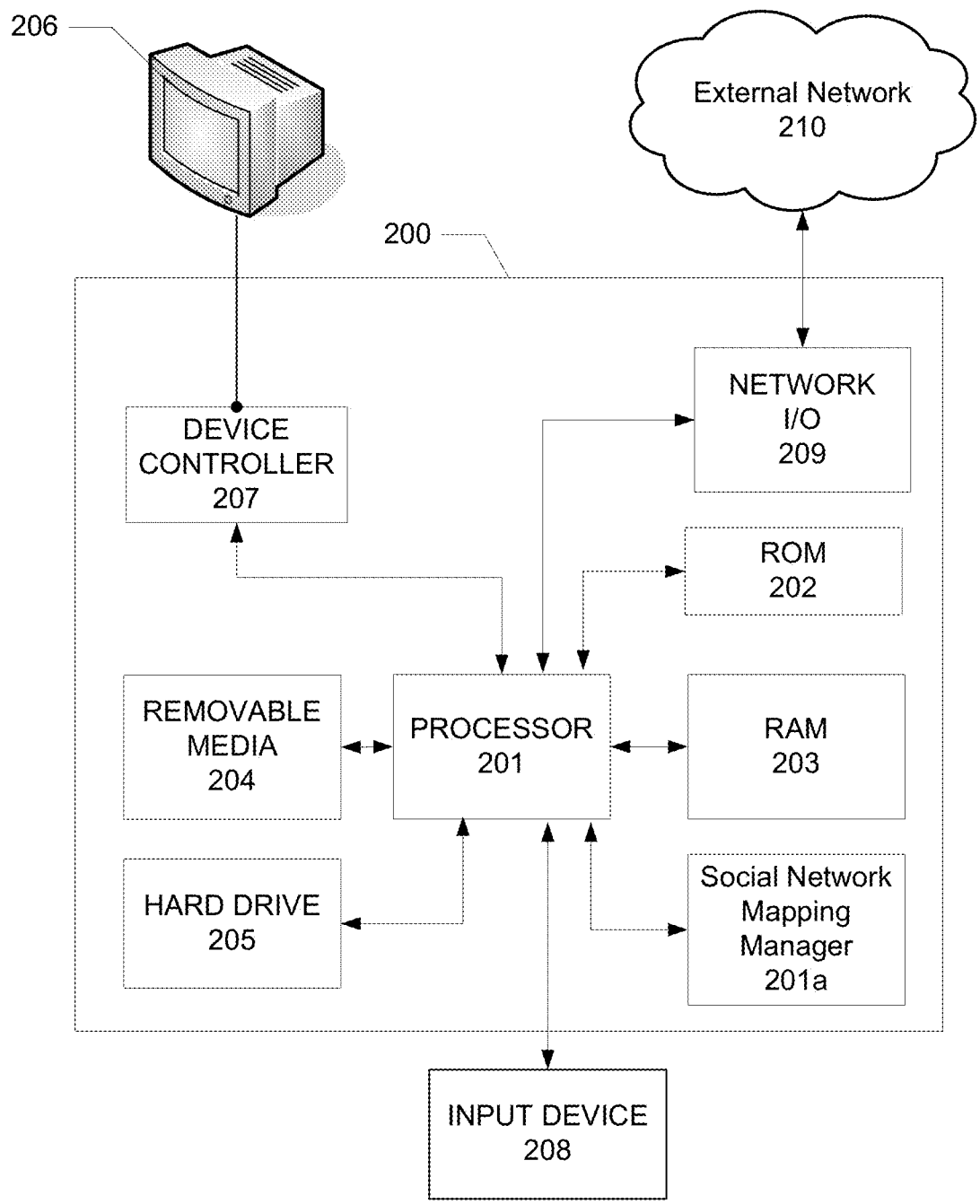
FIG. 2 illustrates an example computing device configuration that can be used to implement any of the servers, entities, and computing devices described herein.

FIG. 2 illustrates general hardware and software elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is a hardware configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device). Additionally, for the social network mapping process described herein, the computing device 200 may include a social network mapping manager 201a, which can perform the various mapping functions described herein as a replacement for, or augment to, any other processor 201 that the computing device 200 may include. That is, the social network mapping manager 201a may include a separate set of computer-executable instructions stored on a computer-readable medium that, when executed by a processor (e.g., processor 201), cause the processor (or the computing device 200 as a whole) to perform the various mapping functions described herein. The social network mapping manager 201a may also include internal secure memory (not shown), which can store the various communication data (e.g., call history logs), criteria for filtering, and generated contact lists described herein. The secure memory can be any desired type of memory, and can have enhanced security features to help restrict access (e.g., can only be accessed by the social network mapping manager 201a, can be internal to the social network mapping manager 201a, etc.). Where the social network mapping manager 201a includes a separate set of computer-executable instructions, these instructions may be secured such that only authorized users may be allowed to modify, augment, or delete them.

In some embodiments, the social network mapping manager 201a may be implemented as an application specific integrated circuit (ASIC). That is, the social network mapping manager 201a may be a chip designed specifically for performing the various mapping functions described herein. Further, the ASIC may be implemented within or in communication with various computing devices provided herein.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
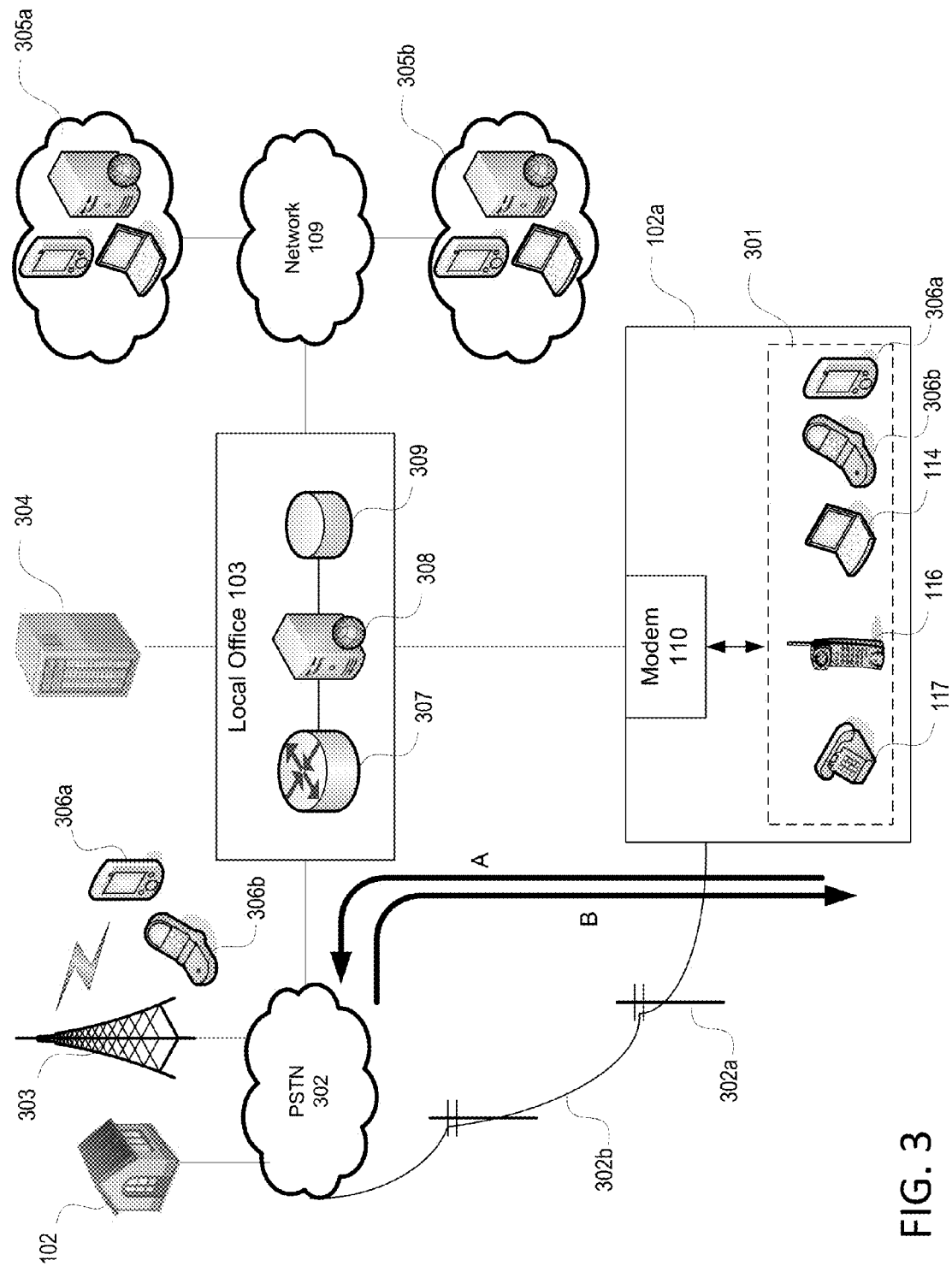
FIG. 3 illustrates a high-level system architecture according to one or more illustrative aspects described herein.

FIG. 3 is a high-level diagram showing an example system architecture 300 on which various features described herein may be performed. The system 300 may comprise devices such as a communications device 301, a modem 110, a local office 103, and one or more social network communication services 305 (e.g., 305a and 305b).

The communications device 301 may be any device configured to make and/or receive a text message (e.g., SMS or MMS text message), an audio, visual, or audiovisual communication call, such as a telephone call, voice over IP call, video call, etc. As shown in FIG. 3, the communications device 301 may be any one of a landline phone 117, a cordless phone (e.g., DECT phone) 116, a computer 114, a smartphone 306a, and a cellular phone 306b. The communications device 301 may be connected to a modem 110 which is in turn connected to the local office 103.

Referring to FIG. 3, the local office 103 may contain a router 307 configured to receive and forward digital signals, a social network mapping platform 308, and a database 309 for storing communication data (e.g., call history logs), instructions for performing functions described herein, criteria used in performing the functions described herein, and instructions for providing a web portal described herein. Although the router 307, social network mapping platform 308, and database 309 are shown within the local office, these components may be external to the local office. Where the router 307, social network mapping platform 308, and database 309 are external to the local office 103, the local office 103 may include interfaces for communicating with them. Further, the router 307, social network mapping platform 308, and database 309 may comprise multiple elements. For instance, the database 309 may include multiple blocks of memory that may be in the same location or not. The social network mapping platform 308 is shown as a single element, but may include a number of computing devices 200 having one or more social network mapping managers 201a. Also, the router 307 may include several routers to perform the function of routing calls between different end users. The routers may be in series and/or in parallel. For example, among two parallel routers, one router may transfer communications between end users on the same network (i.e., having the same local office 103) while the other router may transfer communications between end users having different providers.

In some embodiments, the router 307 may forward calls to additional communication networks, such as a public switching telephone network (PSTN) 302. The PSTN 302 may include telephone poles 302a and telephone wires 302b, and may be connected to premises 102 and 102a and cell towers 303. Although only one premises 102 and one cell tower 303 are shown as being connected to the PSTN 302, one of ordinary skill in the art would understand that the PSTN 302 may be connected to many premises 102 and cell towers 303. Further, one of ordinary skill in the art would understand that the PSTN 302 may include other devices and communication lines for switching and routing calls. For example, the PSTN 302 may include a base station controller for routing calls to the appropriate cell tower 303. The cell tower 303 may then transmit calls wirelessly to cellular devices, such as smartphones 306a and cellular phones 306b.

The router 307 may also communicate with one or more electronic number mapping (ENUM) servers 304. The ENUM server 304 may be configured to perform electronic number mapping to translate Internet Protocol (IP) packets into telephone numbers or vice versa. For example, when an outgoing call is made from a communications device 301 using voice over IP (VoIP), the router 307 may utilize the ENUM server 304 to translate the received IP packets into a telephone number, which can then be provided to the PSTN 302 to connect the call. In some embodiments, the ENUM server 304 may be a Domain Name Server (DNS) type database.

Additionally, the local office 103 may communicate with one or more social network communication services 305 through the network 109, which may be any type of network, including a LAN and/or WAN (e.g., the Internet). The social network communication services 305a and 305b represent different social network communication services, which may be any service, whether opt-in or not, that provides an exclusive communication platform to its members. Each social network communication service 305 may include any computing device 200, such as personal computers, laptops, tablets, smartphones, PDAs, servers, etc. Any computing device 200 on which a user is signed-in or logged-in on may be considered as part of the social network communication service 305. That is, a user may sign-in to the social network communication service 305a using a laptop, and that laptop may be considered as part of the social network communication service 305 as long as the user is signed-in on the laptop.

As an example, a social network communication service 305 may provide a video conferencing service that allows a user of a computing device 200 (e.g., a laptop, smartphone, television, etc.) that is logged-in to the social network communication service 305 to communicate with another user of another computing device 200 logged-in to the same social network communication service 305. An aspect of the disclosure includes providing a contact list to one or more of the computing devices 200 in such a social network communication service 305 so that a user may more easily initiate communication with others in the contact list. Additional aspects relate to collecting and processing data representing communications (e.g., call history logs) to generate such a contact list. Still other aspects relate to prioritizing the contact list.

Hereinafter, FIG. 3 is described in more detail with respect to two different example communication paths A and B. The two paths are referred to below in descriptions of other figures.

Figures 4A, 4B:
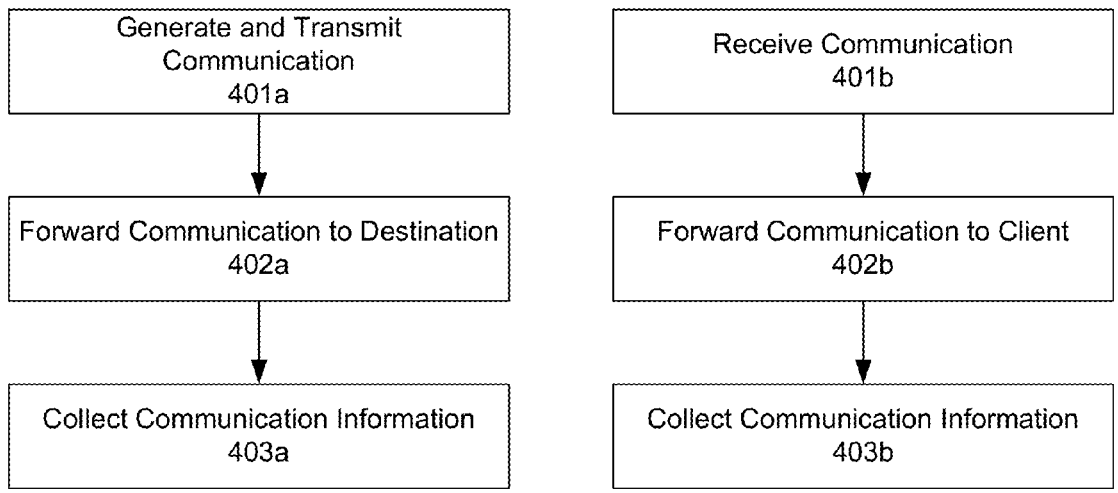
FIGS. 4A and 4B are flow diagrams illustrating example methods of the present disclosure.

Referring to FIG. 4A, a process of generating call history data (e.g., call history logs) when an outgoing call is placed is shown. One example process begins with step 401a in which a user makes a call (e.g., by dialing or referencing a telephone number). The call may be a text message (e.g., SMS or MMS text messages), an audio call, video call, or an audiovisual call, such as that used in videotelephony applications (e.g., videoconferencing). A user can initiate the call using any communications device 301, such as a smartphone 306a, a cellular phone 306b, a landline phone 117, DECT phone 116, or computer 114.

Where a smartphone 306a or cellular phone 306b is used, initiating a call may comprise generating a cellular signal to communicate directly with a cell tower 303 or communicating through the modem 110.

Where a landline phone 117 is used, initiating the call may comprise generating an analog signal. That is, the landline phone 117 may be a traditional analog twisted pair telephone, which creates an analog signal. The analog signal may then be transmitted to a modem 110. When sent to the modem 110, the modem 110 may convert the analog signal into a digital signal and transfer the call upstream to the local office 103. Alternatively, the landline phone 117 may be a Voice over Internet Protocol (VoIP) telephone, which creates a digital signal itself. The VoIP phone may also transmit its digital signal to the modem 110, which may then transfer the digital signal upstream to the local office 103.

Where a DECT phone 116 is used, initiating the call may also comprise generating a digital signal. The digital signal may be wirelessly transmitted to an access point, which serves as an interface between the modem 110 and the DECT phone 116. At the access point, the digital signal may be forwarded to the modem 110, which can then transfer the digital signal upstream to the local office 103.

Path A of FIG. 3 represents an example communication path that results when a user makes an outgoing call in accordance with step 401a that is transferred through a modem 110. When a digital signal is transferred from the modem 110 to the local office 103, the router 307 decodes the digital signal. That is, the router 307 decides whether the digital signal corresponds to a call or not. Here, the decision may be performed by analyzing the packets of the digital signal. Typically, different protocols are used for digital call data (e.g., voice over IP—VoIP) than digital non-call data (e.g., Internet data). Specifically, the User Datagram Protocol (UDP) is commonly used for VoIP data, while the transmission control Protocol (TCP) is commonly used for non-call data. The different protocols use different packets, and therefore, the type of information (i.e., VoIP or not) can be determined by analyzing the packets.

If the router 307 determines that the digital signal includes VoIP data, then the router 307 may transfer the digital signal to the PSTN in step 402a. As explained above, electronic number mapping may be used to identify the destination for the VoIP data.

In step 403a, information regarding the call is collected. When the call is routed through the router 307 of the local office 103, the router 307 may trigger the social network mapping platform 308 including the social network mapping manager 201a to collect information about the call. Such information may include a call duration, call destination (e.g., area code), time of call, call type (e.g., audio or audiovisual), call direction (i.e., incoming or outgoing), etc. This information may be organized and stored in the database 309 at the local office 103. In some embodiments, the mapping manager 201a may simply rely on the call handling system (e.g., a server offering video conferencing support, a cellular telephone network controller, a VoIP server, etc.) to store information about the call, and that call information may be used as discussed further below when contact lists are needed for a social network. That is, in step 403a, the router 307 may trigger the social network mapping platform 308 to send a request to an external call handling system, which performs the process of collecting the information related to the call. Thus, the social network mapping platform 308 may not actually compute the call information, and instead, may retrieve such call information from external sources.

Referring to FIG. 4B, another example process of generating call history logs is shown. However, FIG. 4B explains how call history logs are generated during incoming calls. Whether a call is incoming or outgoing is defined with respect to the user. Referring to FIG. 3, calls received by the communications device 301 are incoming calls while calls transmitted from the communications device 301 are outgoing calls.

In step 401b, a call may be received at the router 307 of the local office 103. The call may originate at a communications device and travel along path B through the PSTN 302 to the local office 103. The call may include a resource identifier (e.g., data indicating a telephone number) to indicate that its destination is the communications device 301. Based on such a resource identifier, the PSTN 302 can determine that the call should be directed to the router 307.

After receiving a call, the router 307 may decode the digital signal to identify the resource identifier and its corresponding communications device 301. At step 402b, the router may then forward the call downstream to the communications device 301 as shown by path B in FIG. 3. The router 307 may route calls between the PSTN 302 and a communications device 301 placed downstream from the local office 103 or between two communications devices 301 both placed downstream from the local office 103 (i.e., between devices having the same local office 103).

Upon identifying the communications device 301 as the destination for the call, information regarding the call may be collected in step 403b. Again, as in step 403a described above, the router 307 may trigger the social network mapping platform 308 including the social network mapping manager 201a to collect information about the call, and/or the call information may be stored by the call handling system. Such information may include a call duration, call destination (e.g., area code), time of call, call type (e.g., audio or audiovisual), call direction (i.e., incoming or outgoing), etc. Also, this information may be organized and stored in the database 309 at the local office 103.

As a result of performing the processes of FIGS. 4A and 4B, the local office 103 may maintain call history data (e.g., a call history log) for each respective resource identifier. In some embodiments, the same end user may be associated with two or more resource identifiers. For example, a person may have two home phone lines. In such cases, the end user may choose to have their call history logs merged. However, this may not always be the case. For example, where one phone line is used for a home business and the other phone line is for personal use, it may be desirable to keep the call history logs separate. Still, in other embodiments, the call history logs for different resource identifiers may be merged into a single call history log, but that single call history log may include data indicating the particular phone line associated with each call so that the call history log can be filtered based on the particular phone line used.

Figure 5:
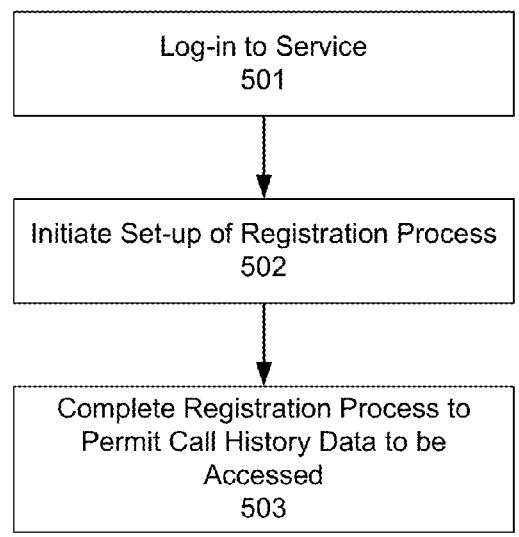
FIG. 5 is a flow diagram illustrating an example method of the present disclosure.

FIG. 5 is a flow diagram illustrating an example method of the present application. In particular, the flow diagram of FIG. 5 illustrates a method for configuring a system 300 in accordance with the present application to allow specific call history data (e.g., a specific call history log) to be accessed and evaluated to determine a list of contacts for a certain social network communication service 305.

In step 501, users may provide authentication information to a computing device 200, such as the social network mapping platform 308 or a server within a social network communication service 305, to identify themselves. For example, a user may sign onto a social network communication service 305 using their username and password. Or, a user may access the social network mapping platform 308 via a web portal on the Internet and provide a username and password through the web portal. Accordingly, the user may be logged-in so that the user has permission to change settings, such as settings identifying which call history log to retrieve and where to retrieve it from.

Once logged-in, the user may be able to initiate the set-up process for registering one or more social network communication services 305 to which the user belongs and/or the social network mapping platform 308 with a communications service that collects call information at step 502. In some embodiments, step 502 may be performed by selecting a button designated for registering with particular communications services (e.g., call handling services). For example, a button for a particular cell phone service provider may exist, which when selected may prompt the user for cell phone account information.

In step 503, the registration process may be completed so that a computing device 200, such as the social network mapping platform 308 or a server within a social network communication service 305, may have permission to access a call history log associated with the user. More specifically, a computing device 200 may receive authentication information identifying a user as a person who is allowed access to a particular call history log. Such authentication information may be a password of an account with a telephone company. For example, in step 503, a user may provide a password to their cell phone account to a computing device 200 so that the computing device 200 has permission to receive the call history log associated with the user's cell phone. Once the computing device 200 is given permission to access the call history log, the computing device 200 may send a request to the device that stores the call history log. Any protocol, such as the TCP, may be used to send the request for the call history log. As long as the computing device 200 is registered, the computing device 200 may send requests for a specific call history log and retrieve the call history log without further user interaction. That is, a user does not have to provide authentication information each time he/she wishes to update his/her contact list with the most recent call history log. It should be understood that the registration completed in step 503 permits whatever computing device 200 is being used to retrieve the call history log to actually retrieve the call history log. Therefore, the registration may effectively issue a token to a particular user so that when that user is logged-in to a service, the call history log may be retrieved.

Figure 6:
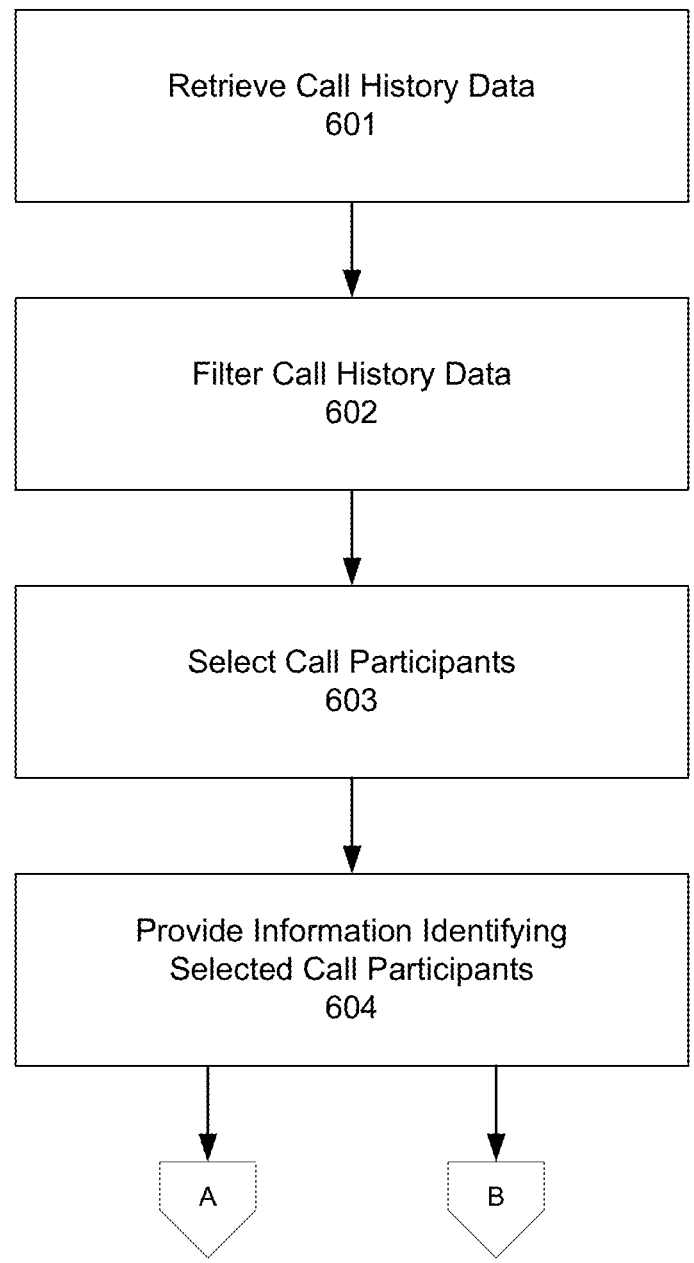
FIG. 6 is a flow diagram illustrating an example embodiment of a mapping process.

FIG. 6 is a flow diagram illustrating an example method of the present application. More specifically, the method of FIG. 6 illustrates an example method for selecting call participants. Herein, call participants refer to the people or resource identifiers (e.g., telephone numbers) respectively associated with the people who receive or place a call from or to a particular person or particular resource identifier. For example, if a first call is a call from Alex to Bob and a second call is from Charles to Alex, then both Bob and Charles would be considered call participants on Alex's call history log. In some cases, where it is not known who the caller actually is, the call participant information may include the telephone numbers that were involved. Further, in some embodiments, call participants may include the people or resource identifiers copied on a communication (e.g., an indirect participant).

The steps in FIG. 6 may be performed by one or more of the above discussed devices, such as a computing device 200 including the social network mapping manager 201a of FIG. 2. In step 601, call history data (e.g., a call history log) associated with a particular person or particular resource identifier (e.g., telephone number) may be retrieved. In some embodiments, the call history log may be retrieved from the database 309 of the local office 103. Additionally, or alternatively, the call history log may be retrieved from a call handling service, such as a cellular phone service company, a VoIP provider, etc. Below, Table 1 illustrates the types of information an example call history log may store. As shown in Table 1, the call history log contains information related to the call history associated with a particular user or resource identifier (e.g., resource identifier 555-555-5555). Table 1 further shows that for each call participant (e.g., 555-111-1111) a call date, call time, call duration, call direction, and call type may be collected and stored. It should be understood that Table 1 is provided to reflect the different types of data that may be stored, and that numerous methods of storing and organizing the information are contemplated.

TABLE 1

Call History Log For (555) 555-5555

| Call Entry | Call Participants | Call Date | Call Time | Duration | Direction | Type |
|---|---|---|---|---|---|---|
| 1 | (555)111-1111 | Jan. 28, 2011 | 1:00 pm | 1 min. | Outgoing | Audio |
| 2 | (555)222-2222 | May 3, 2011 | 5:30 pm | 89 mins. | Incoming | A/V |
| 3 | (555)333-3333 | Jun. 15, 2011 | 11:00 am | 22 mins. | Incoming | Audio |
| 4 | (555)444-4444 | Aug. 19, 2011 | 11:30 am | 4 mins. | Outgoing | Audio |
| 5 | (555)888-8888 | Jul. 23, 2011 | 9:50 pm | 45 mins. | Outgoing | A/V |
| 6 | (555)333-3333 | Oct. 2, 2011 | 11:10 pm | 61 mins. | Incoming | Audio |

Step 601 may be performed periodically according to a set predetermined period of time. For example, step 601 may be performed to retrieve the call history log once every day or at every hour. Additionally, or alternatively, step 601 may be initiated in response to a signal indicating the completion of a call. By performing step 601 after each call is completed, the call history log can be kept current. Still, in other instances, the call history log may be retrieved when a user sets up a social network communication service 305 for the first time. Also, after setting-up a social network communication service 305, step 601 may be initiated in response to a request for call participants received from a social network communication service 305. For example, a user of a social network communication service 305 may select a button on a webpage from within the social network communication service thereby triggering a request for call participants from which the social networking service can generate a contact list.

Next, in step 602, the call history log is filtered according to an algorithm incorporating one or more criteria. The algorithm may search through the information of the call history log to identify data related to the criteria used by the algorithm. The algorithm then uses the identified relevant data to compute a score for each of the call participants of the call history log. The scores may be numeric or alphanumeric values. Example criteria include a call frequency, a call duration, an area code, a call type, a call device, a call time, a call date, etc. The number of criteria used depends on the algorithm used. Also, the algorithm may assign various weights to the criteria. In other words, each criterion does not have to be weighed equally. Rather, for example, the area code of a call may be more heavily considered than the time of the same call, or initiating a call may be more heavily weighted than receiving a call.

The algorithm used for filtering in step 602 may be stored in the database 309 or in a separate database. Further, the different criteria and their respective weights may be stored in memory separate from computer executable instructions that drive the algorithm. In some embodiments, different criteria may be used for different users. Also, in some embodiments, the same criteria may be used for different users, but the criteria may be weighted differently for the different users.

Further, the different criteria used by the algorithm may vary for different social network communication services. That is, where the same user belongs to multiple social networks, the call history log may be filtered multiple times. And different criteria and/or different weights for the criteria may be used each time the call history log is filtered.

In step 603, certain call participants may be selected. More specifically, those call participants that are most likely to also be contacted using a social network communication service 305 may be selected. In some embodiments, the call participants may be ranked based on their respective scores, which were determined in step 602. After ranking the call participants based on their scores, a certain number of the highest ranked call participants (i.e., those call participants most likely to be contacted using a social network communication service 305) may be selected. For example, the call participants having the top ten highest scores may be selected. Various social network communication services 305 may receive different numbers of selected call participants. For example, one social network communication service 305 may receive five selected call participants while another may receive ten selected call participants. Regardless of the number of call participants selected, the highest ranked call participants may be selected. Additionally, or alternatively, a threshold may be used to select call participants. For example, any call participant having a score over a threshold score may be selected. The threshold score may be set by a user or administrator, or may be variable based upon a standard deviation of the scores computed in step 602.

In some embodiments, the selected call participants may be stored in step 603. Also, the scores for the respective selected call participants may be stored as well. In such embodiments, the stored call participants may be used in later instances of the process of FIG. 5 to track changes to the selected call participants. For example, past selected call participants may not have a score that results in their current selection, but these past selected call participants may still be selected based on their past scores.

Subsequently, in step 604, information identifying the selected call participants is provided to a social network communication service. In some embodiments, this information may be pushed to social network communication services that are known to accept and record the information. For example, a social network communication service may be registered with the social network mapping manager 201a so that the social networking mapping manager 201a may transmit information identifying selected call participants to the registered social network communication service whenever new selected call participants are identified. Additionally, or alternatively, the information identifying the selected call participants may be provided when a request for such information is received from a social network communication service.

FIG. 6 shows that the information identifying the selected call participants may be provided to two different destinations (see A and B). In some instances, the information may be externally outputted to destination A and used in the process of FIG. 7A. In other instances, the information may be transferred internally to destination B and used in the process of FIG. 7B.

Figure 7A:
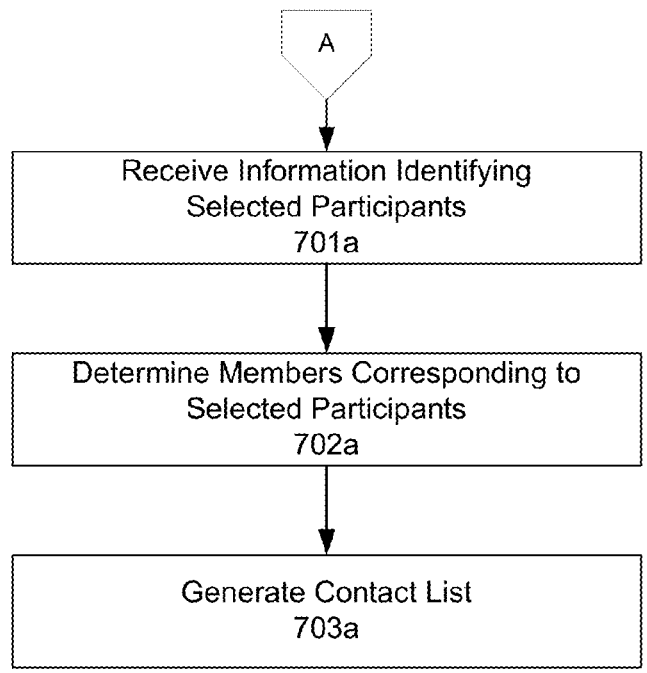
FIGS. 7A and 7B are flow diagrams illustrating example methods of the present disclosure.

FIG. 7A is a flow diagram illustrating an example method of the present application. More specifically, FIG. 7A illustrates a process of generating a contact list. The process of FIG. 7A may be performed by any computing device, like computer device 200, located within a social network communication service 305. For example, the process of FIG. 7A may be performed by a server of a social network communication service 305 or by a processor on an end user's personal computing device.

In step 701a, the information identifying the selected call participants is received at a social network communication service 305. In some embodiments, this information may be received in response to a request initially sent by the social network communication service 305. Additionally, or alternatively, step 701a may be performed whenever the social network communication service 305 is accessed. That is, the information identifying the selected call participants may be loaded whenever a user runs an application that connects the user to the social network 305 thereby permitting communications to others on the social network 305. Additionally, step 701a may be performed periodically after running the application so that contacts can be determined from the most recent call history log information.

Next, in step 702a, the received information is used to determine corresponding members within the social network. In some embodiments, the information identifying selected call participants might not include the usernames of the corresponding members of the social network communication service. For example, the information may provide a name, such as John Doe, but might not include John Doe's username—Jdoe99—in the social network. Therefore, the social network communication service 305 may include a computing device (e.g., computing device 200) for determining usernames of members corresponding to the selected call participants based on names of the call participants. In some embodiments, the social network communication service 305 may compare the names provided in the received information with names given to create an account with the social network communication service 305 to identify the usernames.

Alternatively, the social network communication service 305 may compare resource identifiers (e.g., telephone numbers) of the selected call participants provided in the received information with telephone numbers given to create an account with the social network communication service to identify the usernames. Still, in one or more embodiments, the social networking service may include software or an artificial neural network for determining what usernames may correspond to the selected call participants. For this determination, the software or artificial neural network may consider shared contacts among users, age differences, geographical locations, and other profile information. For example, the social network communication service may choose a username belonging to a teenager, even though the information received may indicate a telephone number associated with both a parent and a teenager, when the username is being chosen for a contact list for another teenager.

Also, it is possible that the information received in step 701a may contain one or more selected call participants who are not members of the social network communication service 305. Thus, usernames for these call participants would not be identified.

If usernames are identified, the identified usernames may be used to generate a contact list at step 703a. The contact list may list the usernames in order of their ranking as determined in step 603. The contact list may appear in a pane on a webpage of the social network communication service or in a window floating over the webpage.

In some embodiments, identified usernames may be used to update an already existing contact list. That is, step 703a may move identified usernames that are in the already existing contact list to the top of the contact list. Or, the identified usernames may be highlighted or otherwise marked so that they are more easily recognized as selected contacts.

In any event, the contact list generated in step 703a may include links. For example, the usernames included in the contact list may contain links that, when selected (e.g., clicked on with a mouse or other stylus), may cause the computing device displaying the contact list to navigate to a webpage related to the username (e.g., to the homepage or profile page associated with the username). Additionally, or alternatively, selecting a link may initiate a communication interface through which the user selecting the link may communicate with the member corresponding to the username over the social network. For example, selecting a link may place a call and/or initiate streaming of audiovisual data.

Figure 7B:
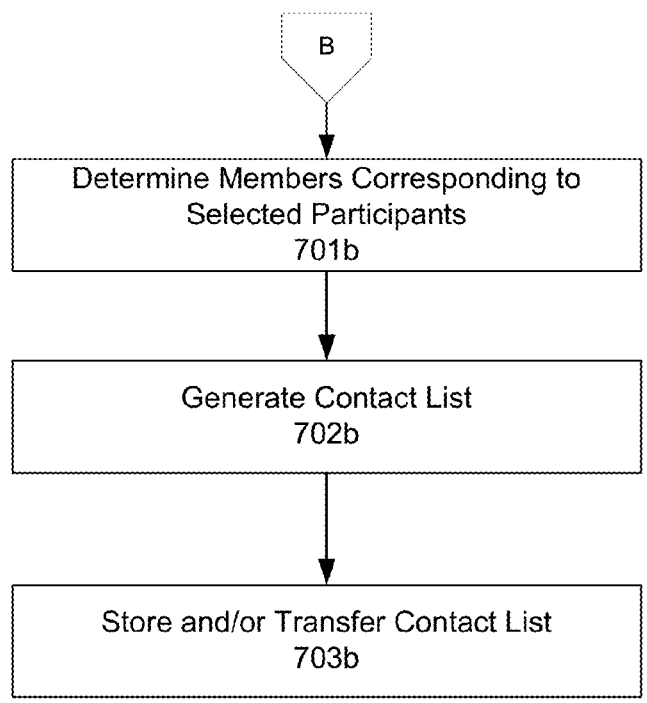

FIG. 7B is a flow diagram illustrating an example method of the present application. More specifically, FIG. 7B illustrates a process of generating a contact list. The process of FIG. 7B may be performed by any computing device, such as computer device 200, maintained by the same entity responsible for selecting the call participants. For example, the process of FIG. 7B may be performed by a server of the same local office 103 that selects the call participants. Thus, where the same entity that filters the call history log is also providing the social network communication server, the steps of FIG. 7B may be performed, as opposed to the steps of FIG. 7A.

In step 701b, members of a social network are determined from information identifying selected call participants. The database 309 or another database of the local office 103 (or in communication with the local office 103) may store call participants and their corresponding usernames. Therefore, the information identifying the call participants may be used to look-up members' usernames.

Once one or more usernames are determined, they may be included in a contact list generated at step 702b. As explained above, the contact list may order the usernames according to their respective ranks determined in step 603. Subsequently, the contact list may be stored and/or transferred downstream to a client device at step 703b. The contact list may be stored in the same database that includes the call participants and corresponding usernames. Here, because a database is maintained with call participant information and corresponding usernames, a contact list can be generated and stored without the assistance of an external social network communication service. And thus, when a member logs-in to an associated social network, the contact list can be immediately transferred to the user without additional computation at the user end.

Figure 8:
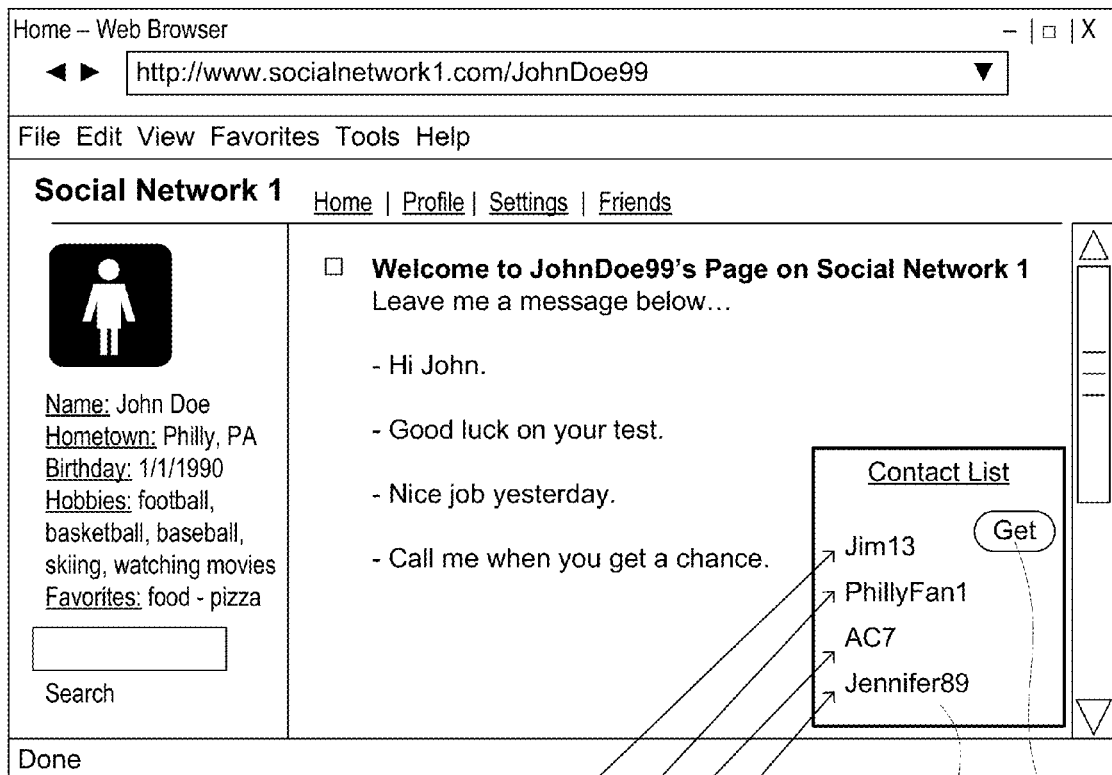
FIG. 8 is a high-level diagram illustrating an example embodiment of an aspect of the present disclosure.

FIG. 8 is a high-level diagram illustrating an example webpage 800 of a social network communication service. The webpage 800 may be viewed using a web browser, such as INTERNET EXPLORER, MOZILLA FIREFOX, etc. The web browser may be directed to the webpage by entering a URL for the webpage 800. In some embodiments, before the webpage 800 can be viewed the user of the web browser may have to log-in to the social network communication service.

The webpage 800 of a social network communication service may belong to a specific member of the social network communication service. When a person creates an account with the social network communication service, that person may be provided with the webpage 800. That is, a person may be given storage space on a server of the social network communication service and the ability to customize certain aspects of their webpage 800. For example, the creator of the webpage 800 may be able to post information about themselves, pictures, links to other webpages, etc. on their webpage 800.

In some embodiments, each member of a social network communication service may have a webpage 800. When a member signs-on or logs-in to the social network communication service, that member may be directed to their particular webpage 800. That is, the social network communication service may be able to identify the webpage 800 of the person signing-on or logging-in to the social network communication service based on, for example, the username entered when the person signed-on. Furthermore, the social network communication service may also generate a contact list 801 for the webpage 800 when a person signs-in with a username corresponding to the webpage 800. More specifically, the social network communication service may generate the contact list 801 for the webpage 800 using information identifying selected call participants provided to the social network communication service.

As shown in FIG. 8, the contact list 801 may appear in a portion of the webpage. In some embodiments, the contact list 801 may appear in a pane designated for the contact list. The contact list 801 may include one or more member names. Herein, "usernames" refers to those names that are used within a social network communication service to identify the different members. Thus, the usernames might not be the actual name of the member, although it may be in some cases.

FIG. 8 also shows that the usernames may correspond to call participants from a call history log. For example, in FIG. 8, the contact list 801 on the webpage 800 created by John Doe may be populated automatically using a call history log retrieved from a call handling service that John Doe uses to make telephone calls. The social network communication service 305 may be provided with selected call participants from John Doe's call history log, and, based upon those selected call participants, may determine corresponding usernames. For instance, the call participant associated with the telephone number "(555) 222-2222" may correspond to a member of a social network communication service 305 having the username "Jim13." Accordingly, the contact list 801 on John Doe's webpage 800 may display the username "Jim13." In some embodiments, the contact list 801 may display the usernames in an order corresponding to the ranking that was used to determine the selected call participants. In FIG. 8 the usernames are derived from the call participants of a single call history log, however, multiple call history logs may be used to populate a single contact list 801. Vice versa, a single call history log may be used to populate a contact list 801 and other contact lists for other social network communication services 305.

Further, the usernames appearing in the contact list 801 may include links to contact the corresponding members or to direct the web browser to navigate to another webpage associated with the corresponding members. For example, clicking on the username "Jim13" shown in the contact list 801 may initiate a chat session with the person signed-on as Jim13 or may direct the web browser to navigate to Jim13's webpage within the same social networking service.

In some embodiments, the contact list 801 may only appear on the webpage 800 when viewed by the person signed-on with the username corresponding to the creator of the webpage 800. For example, referring to FIG. 8, the webpage 800 belongs to the member whose username is "JohnDoe99," and therefore, only the person who signs onto the social network service (e.g., Social Network 1) as JohnDoe99 may be able to view the contact list 801. Even if other members view the webpage 800 of JohnDoe99, the other members may not be able to see the contact list 801 provided for JohnDoe99.

Additionally, or alternatively, the contact list 801 may only appear when a get contact list button 802 is selected. In some embodiments, selecting the get contact list button 802 may update the contact list 801. When the get contact list button is selected, computer executable code (e.g., a JavaScript) may be interpreted to send a request for the most recent selected call participants, and then determined their respective usernames if there are any.

It should be understood that the device used to run the web browser for viewing the webpage 800 may not control whether the contact list 801 is visible. Rather, the username that is used to sign-on to the social network service may be the deciding factor as to whether or not the contact list 801 is visible.

Alternatively, in some embodiments, the contact list 801 may be visible by anyone who visits the webpage 800. That is, a person signed-on with another username may be able to navigate to JohnDoe99's webpage 800 and view JohnDoe's contact list 801. Also, whether a contact list is shown to everyone or just the creator may be a setting.

Figure 9A:
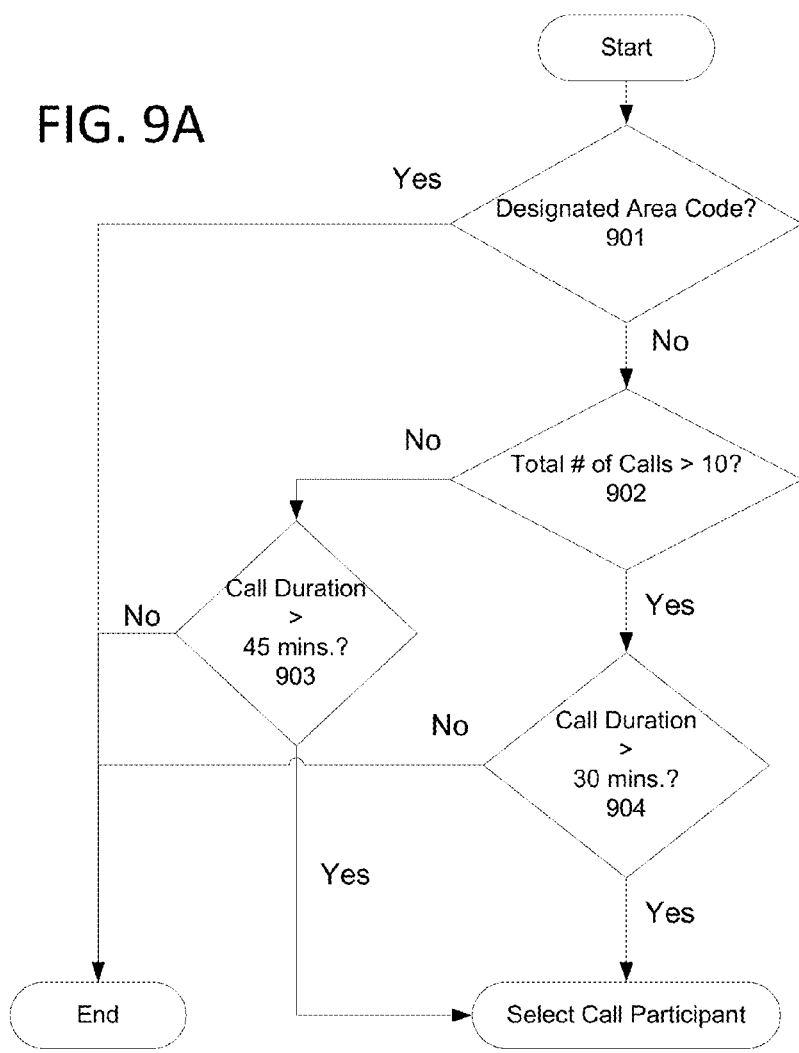
FIGS. 9A and 9B are flow diagrams illustrating example embodiments of additional aspects of the present disclosure.
Figure 9B:
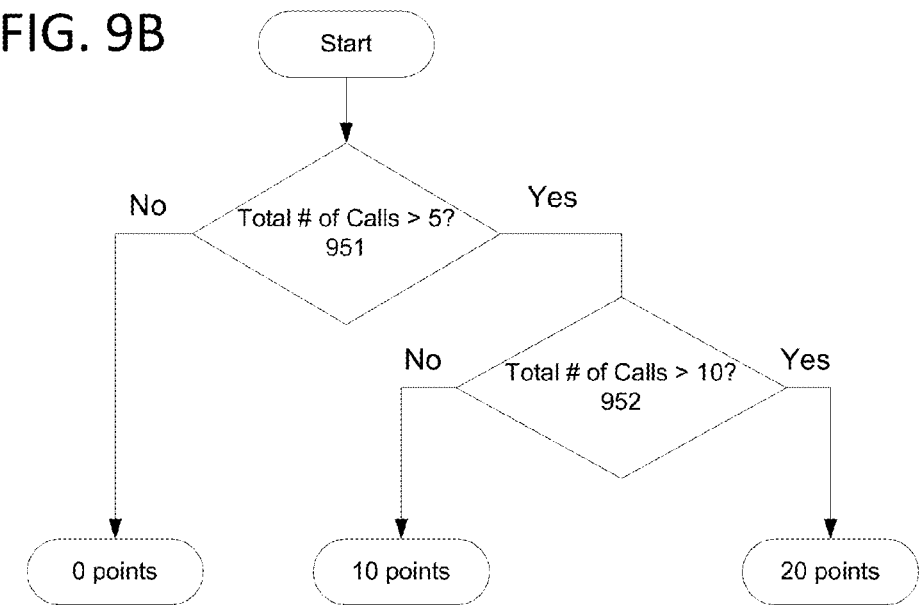

FIGS. 9A and 9B are flow diagrams illustrating an example method of the present application. More specifically, FIGS. 9A and 9B illustrate steps of example algorithms that may be used to filter a call history log. The steps in FIGS. 9A and 9B may be performed by one or more of the above discussed devices, such as a computing device 200 including the social network mapping manager 201a of FIG. 2.

The example algorithms of FIGS. 9A and 9B show steps that may be performed on each call entry. Within any given call history log, there may be one or more call entries. Each call entry represents a call that was made to or from the person or telephone number that the call history log is related to. Example call entries are shown in Table 1. Accordingly, if the call history log of Table 1 was subjected to the example algorithms of FIGS. 9A and 9B, the steps of FIGS. 9A and 9B would be performed on each of the six call entries.

The algorithm of FIG. 9A begins with step 901 in which a call entry in a phone call history log is analyzed to determine whether the call participant of the call entry matches one or more designated area codes (e.g., an 800 area code, an 866 area code, a 215 area code, etc.). The designated area codes used in step 901 may be set by a user using the web portal 1000 described below. If the call participant has a matching area code (Yes at step 901), the instance of the algorithm for the corresponding call entry is ended and the corresponding call participant is not selected. On the other hand, if the call participant does not have a matching area code (No at step 901), then the algorithm proceeds to step 902.

Step 901 provides an example of a step for avoiding selection of certain call participants on the basis of an area code. In some embodiments, additional or alternative steps may be implemented for avoiding selection of certain call participants. For example, the algorithm of FIG. 9A may include a step for determining whether a phone number of a call entry matches a phone number in a set of phone numbers known (or assumed) to be associated with call participants that are not to be included in a contact list. For example, the algorithm may include a step of determining whether a phone number of a call entry matches a phone number of a business, organization, or other similar entity. To perform such a comparison, the algorithm may implement a database including phone numbers of businesses, organizations, and/or other entities (e.g., a computer-implemented yellow pages).

In step 902, the algorithm determines whether the number of calls (e.g., both incoming and outgoing calls) with the same call participant within the same call history log is greater than a preset frequency threshold. The preset frequency threshold used in step 902 may be set via the web portal 1000. For example, the preset frequency threshold may be set to ten so that the algorithm identifies call participants that are on more than ten different call entries within the call history log. Thus, the algorithm may identify call participants that exceed a particular call frequency. If the number of times the same call participant is in the call history log is equal to or less than the preset frequency threshold (No at step 902), the algorithm may proceed to step 903. Alternatively, in some embodiments the instance of the algorithm for the corresponding call entry may be ended when the call participant has not met the preset call frequency. Meanwhile, if the call participant is in the call history log a greater number of times than the preset frequency threshold (Yes at step 902), the algorithm may proceed to step 904.

In the example algorithm of FIG. 9A, steps 903 and 904 are similar. That is, both determine whether the call duration of the call entry is greater than a preset duration threshold. The preset duration thresholds used in steps 903 and 904 may be set via the web portal 1000. Notably, the preset duration thresholds of used in steps 903 and 904 may be different. This is not required, but may be the case where steps 903 and 904 are both performed in response to the same step, such as step 902 in FIG. 9A. As shown by way of example in FIG. 9A, the preset duration threshold of step 903 may be higher than the preset duration threshold of step 904. Here, this may be the case because the call entry that is subject to step 904 may be held to a lower standard because the call frequency is greater than the preset frequency threshold as determined in step 902.

If the respective preset duration threshold is not exceeded in step 903 or 904 (No at step 903 or 904), then the instance of the algorithm may end. In contrast, if the respective preset duration threshold is exceeded in step 903 or step 904 (Yes at step 903 or 904), then the call participant for the corresponding call entry may be selected or given a score that may subsequently be used to determine if the call participant should be selected.

In the above explanation, the criteria considered are just some examples of the many criteria that may be used. Different criteria may be used for different people and different social network communication services 305. When designing or customizing the algorithm, consideration may be given to the various scenarios that may occur that would likely indicate whether or not a call participant is desirable as a suggested contact on a contact list for a social network communication service 305. For example, one reason why the algorithm may require a minimum call duration is to prevent call participants who call frequently but are ignored, and thus, such call participants are not desirable as contacts for a social network communication service. Other reasons are contemplated which may form the basis for deciding how to design the algorithms described above.

Referring to FIG. 9B another example method of the present application is illustrated. FIG. 9B shows that an algorithm may include multiple steps that analyze a call entry based on the same criteria. In the algorithm of FIG. 9B, the criteria is a total number of calls in a preceding week. FIG. 9B shows only two steps, but three or more steps may analyze the same criteria.

In step 951, the algorithm determines whether the call participant of a call entry is included in more than five call entries in the immediately preceding week. For example, step 951 determines if a user (i.e., the person the call history log pertains to) has called or received calls from the same person more than five times in the last week. If the same call participant is not included in five different call entries within the last week (No at step 951), then the algorithm may assign a score of zero points to the call entry. The algorithm may then end or initiate another algorithm to evaluate other criteria. On the other hand if the same call participant is included in five different call entries within the last week (Yes at step 951), the algorithm may perform step 952.

At step 952, the algorithm may determine whether the call participant of the same call entry is included in more than 10 call entries in the immediately preceding week. If the same call participant is not included in more than ten call entries within the last week (No at step 952), then the algorithm may assign a score of ten points to the call entry. Meanwhile, if the same call participant is included in more than ten call entries within the last week (Yes at step 952), then the algorithm may assign a score of twenty points to the call entry. For example, a call participant would get ten points if he/she is included in seven calls within the last week, but would get twenty points if he/she was involved in twelve calls within the last week. Thus, a call participant's score may escalate the more the call participant is in contact with the specific user so that the call participant is more likely to appear on the specific user's contact list.

When the algorithm finishes, the scores may be added up for each call entry to determine which call entries to suggest for a contact list in a social network communication service 305. Accordingly, the algorithm may provide a prioritization scheme for use in determining which call participants are eventually selected for inclusion in a contact list. It should be understood that the scores used in FIG. 9B are just examples and may be different for each algorithm.

In FIGS. 9A and 9B described above, the thresholds may function as weights for the criteria evaluated. Thus, by changing the thresholds relative to one another, the significance given to the different criteria may be adjusted. Likewise, where scores are assigned, adjusting the values of the scores may function to weigh different criteria. For example, by giving more points as a result of steps for evaluating call frequency than as a result of steps for evaluating call duration, call frequency may be weighed more heavily. Further, it may be desirable to give more weight to outgoing calls than to incoming calls, and therefore, higher scores may be given to outgoing calls than to incoming calls. Thus, a call participant in an outgoing call may be more likely to be selected for a contact list 801 than a call participant of an incoming call.

FIG. 10 is a high-level diagram illustrating an example web portal 1000. The web portal 1000 may include one or more webpages provided by a server of the local office 103. Initially, an administrator (or other authorized person) may set a default algorithm used to generate contact lists. In some cases, the web portal 1000 may include a webpage that is only accessible by an administrator for the purpose of setting and/or modifying the default algorithm. However, as shown in FIG. 10, the web portal 1000 may allow users to customize the algorithm used to generate their respective contact lists. Users may modify the criteria used in the algorithm and/or may modify the relative weight given to the criteria. For example, a user may choose to give more weight to the time a call is made than to the duration of calls. Where a user places or receives a relatively large amount of calls during the day for work purposes, that user may wish to assign a lower weight to such calls so that the call participants for these calls are less likely to be selected for a contact list on a social network communication service. On the other hand, where the social network communication service 305 is designed for or focused on creating business relationships (e.g., LINKEDIN), then the user may wish to weigh daytime calls more heavily.

As mentioned above, the same user may belong to multiple social network communication services 305. Through the web portal 1000, a user may indicate which social network communication services he/she belongs to. The user may register the social network communication services 305 with the local office 103 via the web portal 1000 so that the local office 103 may communicate with the social network communication services. Registering social network communication services 305 may include providing the web portal 1000 with the username and password of the social network communication service 305. As a result of registration, the social network communication service 305 may authenticate data received from the local office without member interaction.

In some cases, a user may belong to multiple social network communication services 305, but decide that not all of their social network communication services 305 should receive a contact list generated from call history logs. The user may set specific criteria and weights using the web portal 1000 for each social network communication service 305 that the user desires to register. Thus, each of the user's social network communication services 305 may receive different selected call participants, and therefore, may generate unique contact lists.

In some embodiments, the web portal 1000 may be displayed after a call is completed. In such cases, the web portal 1000 may prompt the user to indicate whether the call participant in the recently completed call should be added to the contact list of a social network communication service 305. For example, when a user ends a call on his/her cell phone, an application on the cell phone may run to prompt the user whether he/she would like to add the person they just spoke with to one or more of their social network communication services 305.

Although example embodiments are described above, the various features and steps may be combined, divided, omitted, and/or augmented in any desired manner, depending on the specific secure process desired. This patent should not be limited to the example embodiments described, but rather should have its scope determined by the claims that follow.

I claim:

1. A method comprising:
retrieving, by a device and from a first communication service, data representing communications of a first user made using the first communication service;
filtering, by the device, the data using one or more criteria, wherein the filtering comprises computing a first filtering score associated with each communication participant in a plurality of communication participants, resulting in first filtering scores;
selecting a first group of users of the first communication service other than the first user, wherein the selecting comprises comparing the first filtering scores with a threshold and determining that a number of communication instances in the data between the first user and each user in the first group of users exceeds a threshold value;
selecting a second group of users of the first communication service other than the first user and the first group of users, wherein the selecting comprises determining that communications between the first user and each user in the second group of users satisfy a criterion other than the number of communication instances exceeding the threshold value;
providing information to a second communication service, different from the first communication service, identifying the first group of users as proposed contacts for the first user in the second communication service.

2. The method of claim 1, wherein the one or more criteria are two different criteria selected from among a call frequency, a call duration, an area code, a call type, a call device, a call time, and a call date.

3. The method of claim 1, wherein the filtering comprises using two or more criteria and assigning a first combination of weights to the two or more criteria.

4. The method of claim 3, further comprising:
filtering a second time, comprising assigning a second combination of weights, different from the first combination of weights, to the one or more criteria and computing a second filtering score.

5. The method of claim 1, wherein the proposed contacts are provided as a proposed update to an existing contact list for the first user in the second communication service.

6. The method of claim 1, wherein the retrieving of the data is performed by the device in response to a request for the proposed contacts from the second communication service.

7. The method of claim 1, wherein selecting the first group of users comprises selecting a predetermined number of call participants from a call history log.

8. The method of claim 1, further comprising storing the information identifying the selected first group of users in a database.

9. The method of claim 1, further comprising:
comparing the selected first group of users to a list of previously selected one or more users;
detecting users included in the list of previously selected one or more users but not in the selected first group of users; and
providing information to the second communication service identifying the detected users as proposed contacts for the first user in the second communication service.

10. The method of claim 1, wherein the retrieving of the data from the first communication service is performed periodically.

11. A method comprising:
filtering, by one or more computing devices, communications data representing communications of a first user made using a first communication service, wherein the filtering comprises computing a filtering score associated with each communication participant in a plurality of communication participants, resulting in filtering scores;
determining, by the one or more computing devices, a first plurality of users of a second communication service to be proposed as contacts for the first user in the second communication service, the first plurality of users selected based on the filtering scores and on determining that a number of communication instances between the first user and each user in the first plurality of users exceeds a threshold value;
determining, by the one or more computing devices, a second plurality of users of the second communication service, different from the first plurality of users, to be proposed as contacts for the first user in the second communication service, the second plurality of users selected based on determining that communications between the first user and each user in the second plurality of users satisfy a criterion other than the number of communication instances exceeds the threshold value; and
generating a contact list comprising the first plurality of users and the second plurality of users for the first user.

12. The method of claim 11, further comprising:
transferring the contact list to a user device associated with the first user when the first user logs-in to the second communication service using the user device.

13. The method of claim 11, wherein
computing the filtering scores comprises using two or more criteria and a combination of different weights for the two or more criteria.

14. The method of claim 13, wherein the two or more criteria are two different criteria selected from among a call frequency, a call duration, an area code, a call type, a call device, a call time, and a call date.

15. The method of claim 13, further comprising receiving the combination of different weights from the first user via a web portal.

16. A method comprising:
retrieving, by a device, communication data related to one or more communications between a first user and a second user;
filtering the communication data using one or more criteria, wherein the filtering comprises computation of a filtering score associated with the second user;
selecting the second user for a first group of proposed contacts for the first user in a communication service based on the filtering score and if a number of communications instances between the first user and the second user exceeds a threshold value;
if the number of communication instances between the first user and the second user does not exceed the threshold value, selecting the second user for a second group of proposed contacts for the first user in the communication service if communications between the first user and the second user satisfy a criterion other than the number of communication instances exceeding the threshold value; and
retrieving information identifying the second user from a source other than the communication data when the second user is selected.

17. The method of claim 16, wherein selecting the second user for the first group of proposed contacts comprises comparing the filtering score associated with the second user to at least one of a score associated with another user and a threshold score.

18. The method of claim 4, further comprising:
providing information to a third communication service, different from the first communication service and the second communication service, identifying the first group of users and the second group of users as proposed contacts for the first user in the third communication service.

19. The method of claim 1, wherein the criterion is selected from among a call duration, an area code, a call type, a call device, a call time, and a call date.

* * * * *